March 13, 1951     K. B. WEBER     2,545,061
FASTENING CLIP FOR ANTISKID TIRE CHAINS
Filed Oct. 6, 1948
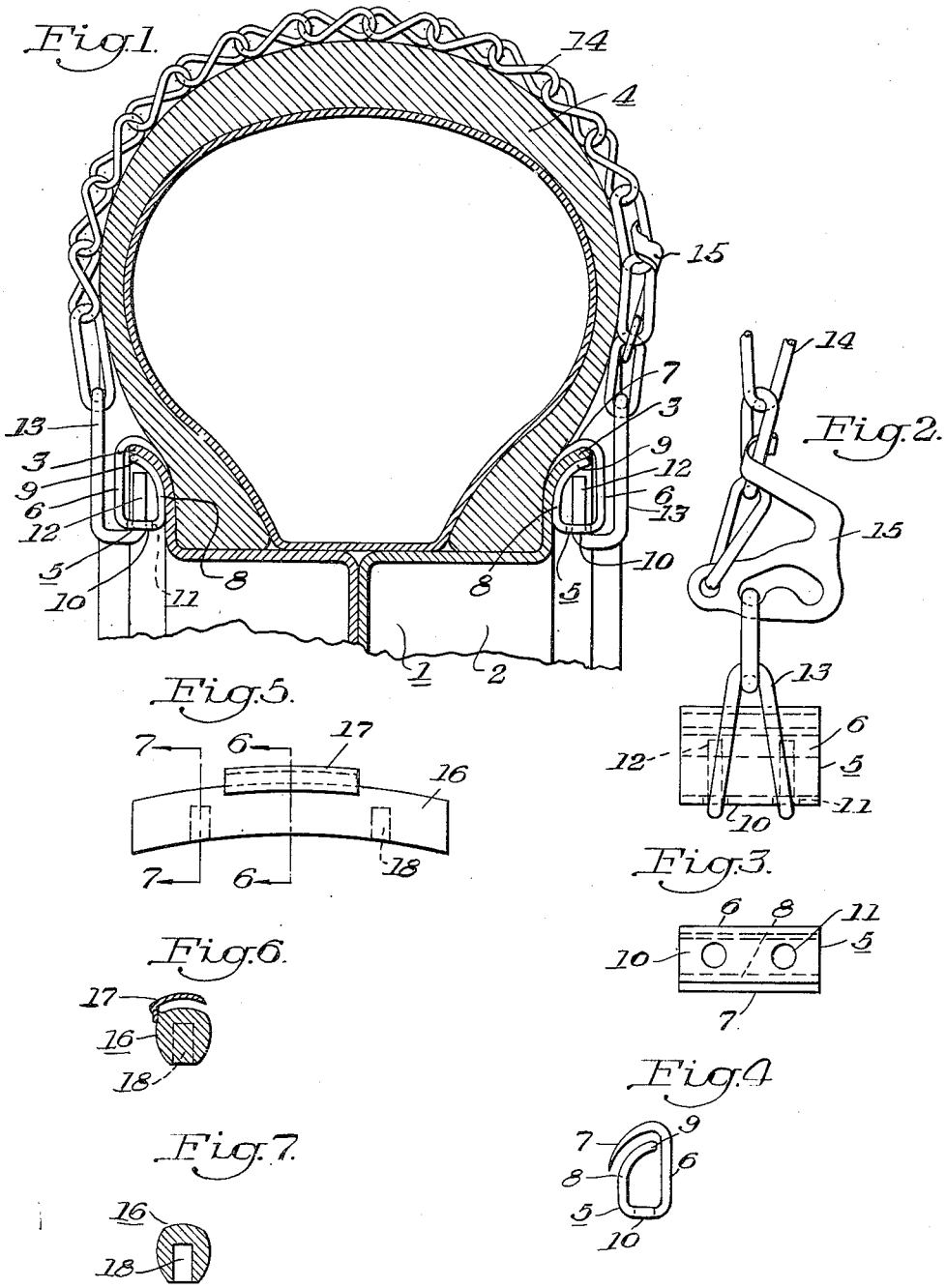
INVENTOR.
Karl B. Weber.
BY
*Jack R. Snyder*
*Attorney*

Patented Mar. 13, 1951

2,545,061

UNITED STATES PATENT OFFICE 2,545,061

FASTENING CLIP FOR ANTISKID TIRE CHAINS

Karl B. Weber, Pittsburgh, Pa.

Application October 6, 1948, Serial No. 53,020

1 Claim. (Cl. 24—259)

This invention relates to an improved fastening clip, and the primary object thereof is to provide a fastening clip of the character described, which is particularly designed and intended for use in pairs for conveniently and successfully securing the ends of an anti-skid cross chain to respective lips of the rim of a motor vehicle wheel.

Further objects and advantages of the invention are to provide a device of the class stated, which will facilitate and to expedite the mounting of anti-skid chains on the tire of the wheel without necessitating the elevating or jacking-up of the latter, which eliminates the need of the conventional side chains for carrying the cross chains, which is securely held in position on the rim lip by the inflated tire itself against one portion thereof and by the constraining force of the pull of the anti-skid chain on another portion of the device, which is simple in its construction and arrangement, durable and efficient in its use, compact, and comparatively economical in its manufacture, installation, and maintenance.

To the accomplishment of these and such other objects as may hereinafter appear, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a composite cross sectional view of a tire and rim carrying an anti-skid cross chain having its ends secured to the rim by a pair of fastening clips constructed and mounted in accordance with the invention.

Figure 2 is a side elevational view of a fastening clip and illustrating the connection of an anti-skid cross chain therewith.

Figure 3 is a bottom plan view of the device.

Figure 4 is an end view thereof.

Figure 5 is a side elevational view of a modified form of fastening clip embodying the present invention.

Figure 6 is a sectional view taken on line 6—6, Figure 5.

Figure 7 is a sectional view taken on line 7—7, Figure 5.

Referring in detail to the drawing 1 denotes a complete motor vehicle wheel of any suitable conventional construction including a rim 2 provided with the usual pair of outwardly flaring lips 3, and a pneumatic tire 4 mounted on said rim 2.

The improved fastening clip comprises a body 5 constructed of an integral strip of spring steel material approximately one inch wide and of a substantial thickness, which strip is bent to shape to form an outer wall 6 with a holding jaw 7 at the upper end, and an inner wall 8 with a clamping jaw 9 at the upper end, and a bottom 10 joined with the lower ends of said outer and inner walls. The terms "outer" and "inner" are herein applied to the fastening clip relatively to the position of the latter on the wheel rim 2 as will be described.

The holding jaw 7 is disposed inwardly in spaced overlapping arrangement with respect to the clamping jaw 9, which latter is disposed outwardly and normally has its free edge abutted against the inner face of the upper end of the outer wall 6, as clearly shown in Figure 4.

The holding jaw 7 is shaped to conform to the contour of the inner face of the rim lip 3, and is inserted between the latter and the adjacent wall of the tire 4. The holding jaw is compressively secure in such inserted position by pressure exerted thereagainst by the inflated tire.

The holding jaw tapers toward the free edge thereof to diminish its bulk gradually toward said free edge to thereby minimize the displacement of that portion of the tire in forcible contact with said holding jaw.

The clamping jaw 9 is shaped to conform to the contour of the outer face of the rim lip 3, and is compressively held against said outer face of the latter by the inherent resiliency and spring action of the clip structure.

The improved fastening clip is mounted in position on the rim lip 3 by engaging the latter between the holding jaw 7 and the clamping jaw 9 in the manner stated. Such engagement is preferably effected while the tire 4 is deflated, although the clip may be driven to position on the rim lip by means of a hammer in a more or less satisfactory manner. Due to the relative positions of the holding and clamping jaws and to the resiliency of the clip, the latter must be forced to position on the rim lip even if the tire is deflated.

The bottom 10 of the body 1 is provided with a pair of spaced apertures 11 for the reception and engagement of integrally joined dual hooks 12, which jointly provide the terminal link 13 of the anti-skid cross chain 14.

A chain tensioning element 15, of any suitable construction and arrangement and operable to tension or release the cross chain 14 when the latter is mounted on the tire 4, is connected in the cross chain at a position allowing ready access thereto, preferably adjacent to outwardly disposed end of the cross chain, as shown in Figure 1.

It will be obvious that a pair of fastening clips are required for mounting each cross chain 14 on the tire 4, and that such associated pair of clips are secured at horizontally aligned positions on respective lips 3 of the wheel rim 2. Any required number of cross chains may be mounted on the tire to best meet conditions found in practice.

The fastening clips, in the number required, are preferably mounted and carried on the rear wheels of a vehicle during the winter season. When mounting a cross chain, the tensioning element 15 is in the releasing position to allow the dual hooks 12 to be engaged in bottom apertures 11, after which the tensioning element is shifted and secured in the tensioning position, as shown in Figure 2, to draw the chain taut upon the tire. It will be noted that the chain mounting operations are facilitated by mounting the chains on those portions of the tire that are exposed below the rear fenders of the vehicle, and then rotating the wheel to so expose other portions thereof preparatory to mounting chains thereon, until the required number of chains have been mounted on the wheel.

The free ends of the dual hooks 12 abut against the under face of the clamping jaw 9 and in consequence will tend to force the clamping jaw against the lip 3 when the chain is tensioned. Further, during the travel of the wheel, the traction engaged chain will exert a decided pull from the lower outer corner of the clips and thereby tend to draw the holding and clamping jaws into deeper and tighter clamping engagement with the engaged rim lip 3.

The modified form of clip, shown in Figures 5, 6 and 7, comprises a solid bar body 16 carrying a fixed resilient holding jaw 17. The jaw 17 is designed to overlap and engage the inner face of the rim lip 3, while the body 16 is shaped to be engaged against the outer face of the rim lip. The body 16 is provided with a pair of spaced recesses 18 for the engagement of the dual hooks 12 therewith. The attachment and functions of the modified form of clip are similar to that described relatively to the preferred form.

The present invention provides a most durable and efficient device of its kind, which may be economically constructed and conveniently employed for the purposes and in the manner herein set forth.

What I claim is:

A fastening clip for an anti-skid tire chain comprising the combination of an elongated bottom provided with a pair of longitudinally aligned apertures for connecting the chain therewith, an outer wall formed integral with one side edge of said bottom, an inner wall formed integral with the other side edge of said bottom and extending parallel to said outer wall, a clamping jaw formed at the upper edge of said inner wall and curving toward and to the upper edge of said outer wall, and a holding jaw formed at the upper edge of said outer wall and curving in opposed overlapping parallel spaced relation to said clamping jaw, said holding jaw tapering toward the free side edge thereof to form a comparatively thin free side edge.

KARL B. WEBER.

REFERENCES CITED

The following references are of record in the file of this patent:

UNITED STATES PATENTS

| Number | Name | Date |
| --- | --- | --- |
| 445,893 | Hutchinson | Feb. 3, 1891 |
| 771,693 | Apthorp | Oct. 4, 1904 |
| 966,325 | Gilbert | Aug. 2, 1910 |
| 2,224,879 | Nagle et al. | Dec. 17, 1940 |
| 2,346,200 | Tinnerman | Apr. 11, 1944 |
| 2,396,389 | Reynolds | Mar. 12, 1946 |

FOREIGN PATENTS

| Number | Country | Date |
| --- | --- | --- |
| 19,590 | Norway | Dec. 6, 1909 |
| 20,711 | Great Britain | Oct. 29, 1894 |
| 338,343 | France | of 1904 |